July 5, 1966    D. H. ROSS ET AL    3,259,065
SHOCK WAVE INDUCING MEANS FOR SUPERSONIC VEHICLES
Filed April 30, 1959    3 Sheets-Sheet 1

INVENTORS
DON H. ROSS
EUGENE S. RUBIN
BY
ATTORNEY

July 5, 1966 D. H. ROSS ETAL 3,259,065
SHOCK WAVE INDUCING MEANS FOR SUPERSONIC VEHICLES
Filed April 30, 1959 3 Sheets-Sheet 2

INVENTORS
DON H. ROSS
EUGENE S. RUBIN
BY
ATTORNEY

July 5, 1966  D. H. ROSS ET AL  3,259,065
SHOCK WAVE INDUCING MEANS FOR SUPERSONIC VEHICLES
Filed April 30, 1959  3 Sheets-Sheet 3
FIG. 6
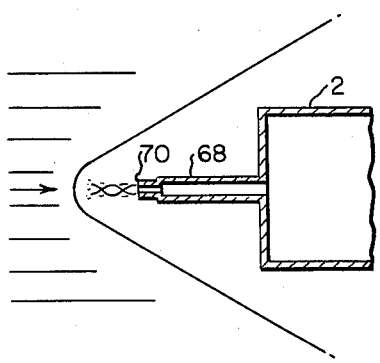
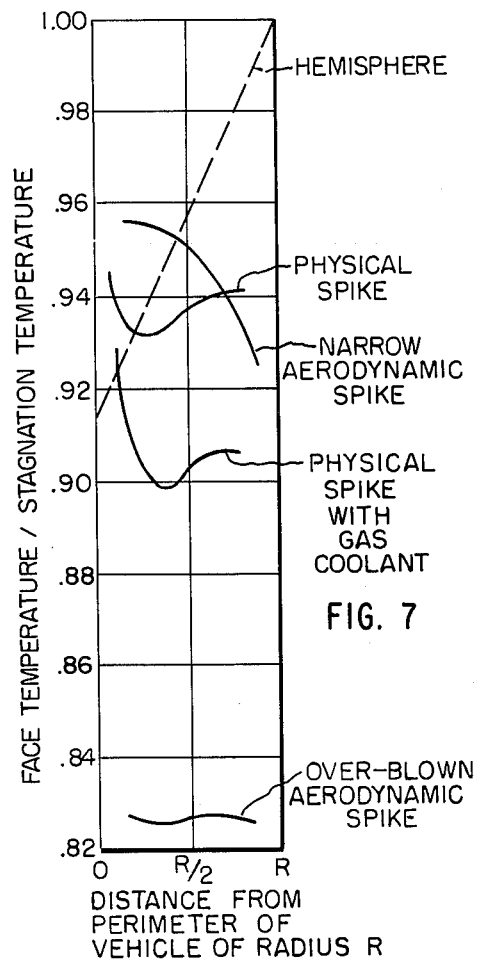
FIG. 7
FIG. 8
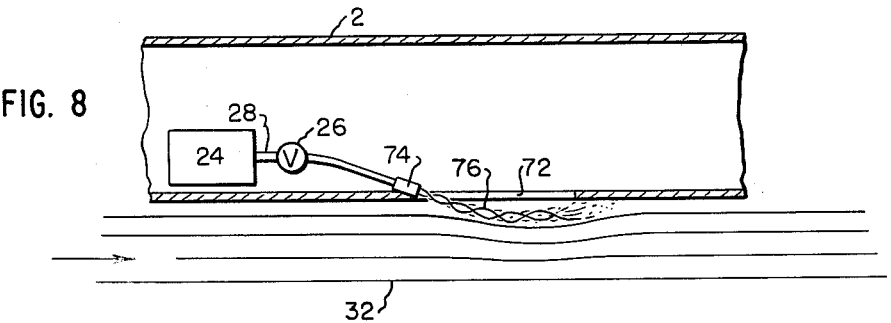
*INVENTORS*
DON H. ROSS
EUGENE S. RUBIN
BY
ATTORNEY

United States Patent Office 3,259,065
Patented July 5, 1966

3,259,065
SHOCK WAVE INDUCING MEANS FOR
SUPERSONIC VEHICLES
Don H. Ross, Newton, and Eugene S. Rubin, Waban,
Mass., assignors, by mesne assignments, to Massachusetts Institute of Technology, Cambridge, Mass., a corporation of Massachusetts
Filed Apr. 30, 1959, Ser. No. 810,178
9 Claims. (Cl. 102—50)

The present invention relates to supersonic vehicles and is concerned more particularly with means for minimizing the drag and temperature rise at the nose or leading edge portions of such vehicles.

In vehicles having a velocity in excess of the speed of sound (Mach number greater than 1) it is customary to employ an extended nose or tip with very gradual increase in cross-section from the tip rearwardly. The shock wave has its origin at the tip and there is very substantial heating of the nose surface by reason of aerodynamic friction. The over-all drag is, however, less than that resulting when a blunt nose configuration is employed.

At speeds substantially in excess of the speed of sound, the problems due to aerodynamic drag and heating become increasingly serious. The problems are further complicated when it is required to embody sensing or seeker systems within the vehicle, particularly if such systems are of the infra-red type. A long tapered or conical nose transparent to infrared provides an unsatisfactory forward-looking window, and the aerodynamic heating of the surface forwardly of the detector element poses obvious problems in signal perception. A blunder configuration, though optically superior, results in still greater friction heating.

It has heretofore been proposed to combine a blunt window at the nose with a forwardly projecting rod, whereby the shock wave may be originated at the tip of the rod resulting in an aerodynamic "shadow" or sheltered zone in front of the window. The objection to this arrangement is, however, the aerodynamic heating of the rod itself, and consequent source of radiant energy tending to mask the response to the desired signals.

The present invention has as an object the provision of novel means for establishing, in a supersonic vehicle having a relatively blunt nose or leading edge configuration, a virtual nose configuration substantially equivalent to the conventional long sharp nose or tip in providing minimum drag, yet substantially free of the aerodynamic heating effects customarily associated with such structure.

More particularly, the invention has as an object the provision in supersonic vehicles, especially those having a Mach number considerably greater than 1, of a nose configuration that permits the use of a "window" that may be relatively blunt, or even flat, without introducing the excessive drag characteristics normally resulting from a blunt configuration, and without appreciable aerodynamic heating either of the "window" itself or from any unwanted source within the shock wave boundary.

Still more specifically, the invention has as an object the provision of means for inducing, without physical structure such as a cone or rod, the inception of the shock wave at the most effective point forwardly of the vehicle for minimizing drag, over an appreciable range of attack angles for the vehicle.

In accordance with these and other objects, a feature of the invention involves the provision in supersonic vehicles of means for controllably generating a virtual nose or cone, or more specifically, a shock wave-inducing virtual or aerodynamic spike or probe, ahead of the vehicle, in such fashion that the actual nose configuration may be relatively blunt or even flat without affecting the optimum drag characteristics established by the virtual nose or spike.

In particular, the invention involves the provision of one or more jets of high velocity gas, projected ahead of the vehicle either on-axis or at a slight angle thereto depending on the particular angle of attack. The encounter of the jet or jets with the air stream is caused to take place substantially at the region where the tip of a physical rod or nose cone would normally be placed to position the shock wave and its shadow in optimum relation to the vehicle body and particularly with relation to the bunt forward end thereof.

While the invention has so far been indicated as being particularly applicable to vehicles wherein a radiation-transparent window is to employed, and will be so described in relation thereto for purposes of illustrating the resultant advantages, it is to be understood that the invention is not so limited, as the aerodynamic or virtual spike may be embodied in the nose or leading edge structure of high Mach number vehicles in a variety of configurations and structures apart from the use of a "window."

The novel features which are believed to be characteristic of the invention, both as to its organization and method of operation together with further objects and advantages thereof, will be better understood from the following description considered in connection with the accompanying drawings in which embodiments of the invention are illustrated by way of example. It is to be expressly understood, however, that the drawings are to be used for descriptive purposes only and are not intended as a definition of the limits of the invention.

FIGURE 6 is a diagrammatic view of the forward portion of a vehicle with a virtual spike supported by a physical spike.

FIGURE 7 is a graph of vehicle face temperatures with physical and aerodynamic spikes.

FIGURE 8 is a diagrammatic view of a side window with a virtual sheath.

Figure 1:
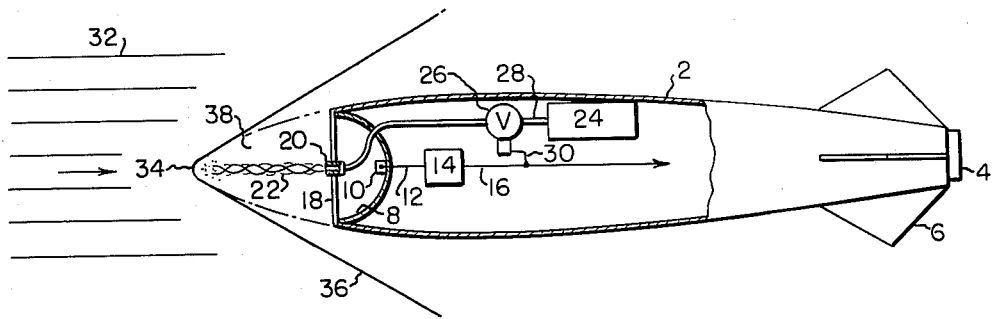
FIGURE 1 is a diagrammatic view of a vehicle with a virtual spike under flight conditions at 0° angle of attack.

Referring to FIGURE 1, a typical supersonic vehicle is shown. The vehicle body 2 is provided with a rocket engine 4 or other suitable means for propulsion. Fins 6 provide means for controlling the flight path of the vehicle. A seeker antenna or mirror 8 focussing upon a radiation-responsive detector 10 has been provided to enable the vehicle to home upon a target. The detector output is fed through line 12 to control computer 14. The output of control computer 14 on line 16 is used to control the positioning of fins 11 by conventional control mechanisms.

It will be noted that a substantially flat face 18, transparent to radiation in the sensitivity range of detector 10, has been provided for vehicle 2. Such a blunt-nosed vehicle has been found impractical in the past, due to the severe drag and heating problems associated with blunt configurations in supersonic flight. Therefore, a shaped body is customarily provided for the nose of supersonic vehicles. While a cone, for example, provides favorable drag characteristics, it results in an optically undesirable structure. Even with the best and most expensive materials, such as fused quartz or sapphire, severe optical distortions are produced. These distortions arise from the fact that information signals must traverse the window at small angles and the fact that these angles vary with the position on the surface of the window. Furthermore, even if the distortions were absent, the heating of the window, particularly near the tip, introduces a serious source of spurious radiation to the detection. Even for vehicles not equipped with seekers, serious structural difficulties are introduced by the intense heating of forward portions in high supersonic flight.

In the present invention, the optical advantages of a hemispherical window, which radiation traverses at uniform 90° angles, can be retained. Furthermore, the heating of the window may be avoided and favorable drag characteristics obtained. In fact, no physical window at all is necessary due to the flow field established by the virtual spike. This window elimination has the additional important advantage of providing a transparent path to the seeker at wave-lengths at which all physical materials are opaque. Accordingly, all available signals may be utilized. The present invention achieves these results without any solid physical structure in advance of the window. Rather, a virtual or aerodynamic spike composed solely of gas is caused to initiate a shock wave in advance of the vehicle. This shock wave is initiated in substantially the same position it would have been initiated by a solid physical structure to "shadow" the vehicle for minimum drag.

In a preferred embodiment shown in FIGURE 1, a nozzle 20 is centrally positioned within face 18 to produce the virtual spike 22. A source of gas under pressure is indicated at 24. Control means 26 serves to control the flow of gas through line 28 to the nozzle 20. When, as hereinafter described, it is desired to control the flow of gas in relation to flight conditions, an output from control computer 14 may be fed to control means 26 through line 30. Control means 26 may be a valve whose opening is continuously variable.

The gas is expelled from nozzle 20 at supersonic velocity to form a jet or virtual spike 22. This virtual spike extends forward into the oncoming supersonic air stream 32 until it terminates at point 34, where a shock wave 36 commences. Behind this shock wave a subsonic boundary layer on the spike forms a conical region of trapped air 38. The air flow around the vehicle 2 is substantially identical to that which would have been produced by the conventional elongated nose cone or probe.

For a representative vehicle, operating at Mach 3.5, a nozzle designed to produce a jet at Mach 2.5 has been found satisfactory. The repetitive diamond structure apparent within the confines of the virtual spike 22 itself is typical of the shock structure at this Mach number as revealed by Schlieren photography and diagrammatically indicated in FIGURE 1.

In general, the best compromise of low drag, minimum gas supply, and satisfactory performance at speeds below the maximum for the vehicle is obtained with a nozzle designed to produce a jet at a Mach number slightly lower than maximum vehicle speed. If, however, minimum drag is desired, the nozzle should be designed to produce a jet at a Mach number somewhat higher than vehicle speed.

In embodiments of the present invention, structural heating with its attendant materials problems has been avoided, since no solid physical structure is disposed forwardly of the window to meet the oncoming supersonic stream. While the forward portion of the aerodynamic spike does experience heating, no structural problem is introduced since the air or other gas is continually replaced. Furthermore, even when a seeker is employed, problems associated with a physical window are eliminated. The attenuation of the target signal by the window is eliminated and the spurious source of radiation due to window heating is reduced due to two factors. First, as noted above, solid material does not remain for continuous heating, which formerly produced a flooding or saturating effect. In addition, the appearance of false targets by non-uniform heating of the window (i.e. hot spots) is no longer a problem. Instead, a continuously replaced non-radiating and non-attenuating aerodynamic window is provided. Even at extreme hypersonic speeds where the gas itself may be heated so severely that it might tend to radiate, such radiation is only a minute fraction of the total radiation which would be produced by a solid body at the same temperature. Moreover, the radiation from a gas is not a continuous spectrum of radiation as would be the case with a heated physical body. Thus, if necessary, the effect of any radiation from the gas can be substantially eliminated by filtering or proper choice of detector frequency response.

Figure 2:
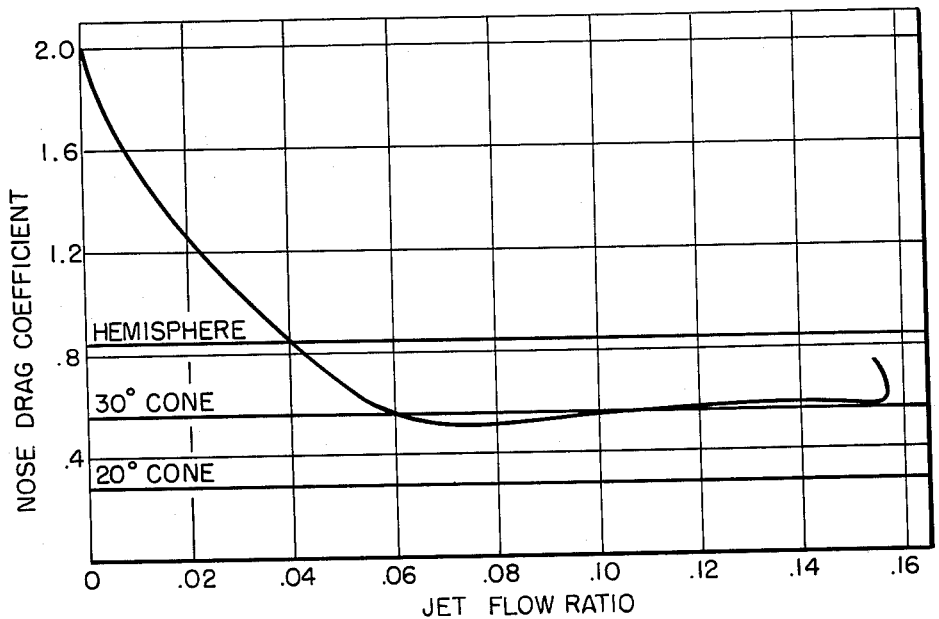
FIGURE 2 is a graph of nose drag coefficients as a function of jet flow ratio.
Figure 3:
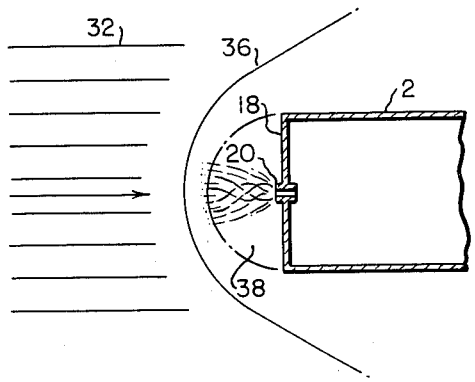
FIGURE 3 is a diagrammatic view of a vehicle with an "overblown" aerodynamic spike under flight conditions at 0° angle of attack.

The operability of the virtual spike over a wide range of conditions is illustrated in FIGURE 2. In FIGURE 2, nose drag coefficient—the face pressure times the face area, plus the jet thrust, divided by the product of the vehicle cross-sectional area and the air stream dynamic pressure—is plotted as a function of jet flow ratio for a typical configuration at Mach 3.5. The jet flow ratio is the mass flow of the jet divided by the mass flow of a theoretical stream tube described by the vehicle cross section area and conditions at the vehicle Mach number. It is apparent that the nose drag coefficient of the blunt nosed vehicle is decreased appreciably by the virtual spike. For reference purposes, lines corresponding to the drag the vehicle would have if provided with a hemispheric nose, a 30° cone noes and a 20° cone nose are provided. It will be seen that as the jet flow ratio is increased, the drag reduces rapidly until it is slightly less than that for a 30° cone. Further increases in jet flow ratio have only a slight effect on the drag, since the increasing reaction from the thrust of the jet just about balances the decreasing aerodynamic drag of the configuration. Eventually, a point is reached where the shock structure of the aerodynamic spike changes, and an "overblown" spike structure results. The drag increases again at this point, approaching that produced by a hemisphere. Thus, the jet flow ratio does not normally need to be critically adjusted but can vary over a substantial range without significantly affecting performance. However, with continuing increases in jet flow ratio, a point is finally reached where the shock structure which has sustained a relatively long narrow virtual spike breaks down and the shorter more turbulent flow shown in FIGURE 3 results.

It will be seen from FIGURE 2 that the minimum drag for this particular configuration is obtained at a jet flow ratio of about 0.07. This would correspond to a mass flow of about 0.055 pounds per second at Mach 3.5 at an 85,000-foot altitude and a 4.5" diameter configuration. Thus, the mass of gas which needs to be supplied for minimum drag is quite modest and could, for example, easily be provided for the duration of normal missile flights by means of a small supply tank of compressed or liquified gas. Alternatively, an intake scoop may be provided to obtain the gas from the vehicle environment and then pressurize it by means such as a propellant squib or turbine, or the exhaust gas from a squib itself may be used to produce the jet.

When vehicles with conventional nose structures are operated at an angle of attack, increased drag results from unfavorable shock wave patterns. Furthermore, if a seeker is employed, the more irregular heat distribution produced on the nose becomes even more troublesome as a source of spurious signals. The virtual spike of this invention may readily be provided with means to optimize its performance over varying angles of attack.

Figure 4:
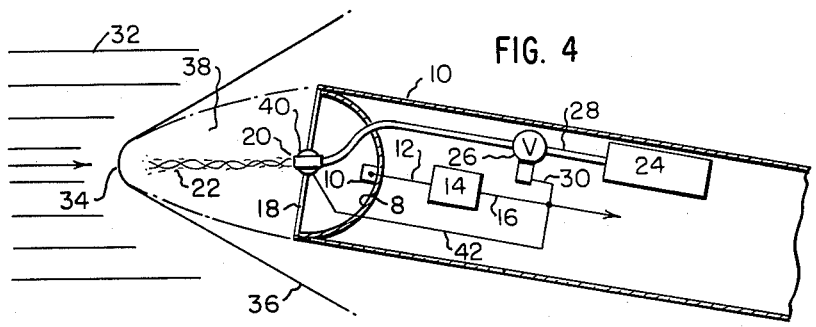
FIGURE 4 is a diagrammatic view of the forward portion of a vehicle with an aerodynamic spike under flight conditions at 10° angle of attack.

Referring to FIGURE 4, an embodiment similar to that of FIGURE 1 has been provided with means to correct for changes in angle of attack. Angular offsetting means 40 offsets the nozzle 20 through an angle equal to the angle of attack, 10° being indicated. The control command may be provided through line 42 from control computer 14. Alternatively, if no control computer associated with a seeker, or no general flight control computer is provided, the angular offset may be controlled with reference to signals obtained from any conventional device responsive to changes in angle of attack. The position of virtual spike 22 is determined by nozzle 20 so that its point of termination 34 at which shock wave 36 originates is repositioned. So repositioned shock wave 36 effectively "shadows" vehicle 2 for travel at this angle of attack. Thus, the advantages of this invention noted earlier have been retained even for flight at finite angles of attack.

Figure 5:
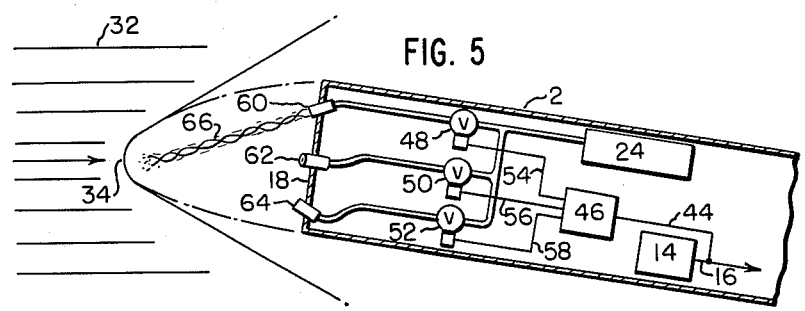
FIGURE 5 is a diagrammatic view of the forward portion of a vehicle with virtual spikes under flight conditions at 10° angle of attack.

FIGURE 5 illustrates another embodiment providing effective angle-of-attack performance. In this embodiment three equidistantly positioned nozzles are employed. An output from flight control computer 14 is fed through line 44 to nozzle controller 46. Controller 46 is a conventional proportional controller controlling valves 48, 50, and 52 through lines 54, 56 and 58 so that the nozzles most in line with direction of flight receive the greatest input of gas. When, as shown, the vehicle 10 is at an angle of attack such that nozzle 60 is in line with environment stream, nozzle 60 alone is activated to produce spike 66. The resulting performance is substantially equivalent to that of the embodiment of FIGURE 4 under the same conditions.

If desired, the three nozzles of FIGURE 5 may be employed without independent control. The spikes produced by the nozzles will meet and merge centrally ahead of the vehicle. While the resulting merged terminal portion of the spike remains centrally located at finite angles of attack, the particular spike most nearly lined up with the flight direction is most effective in forming the shock pattern and produces results quite similar to those of FIGURE 4 under the same conditions. It has been found that the resulting stability is sufficient to provide a structure which effectively shadows a vehicle over angles of attack customary for supersonic vehicles. Furthermore, with the constant centrally merged spike, the need for sensing the angle of attack and controlling nozzles in accordance therewith has been eliminated.

While three nozzles have been used to illustrate plural spike arrangements, a larger number may, of course, be similarly employed. In fact, for missiles likely to be subject to all roll angles a four-nozzle configuration is preferable to a three-nozzle configuration. While some improvement in the fineness of control is achieved with further increases in the number of nozzles, the improvement would not normally justify the increased equipment.

While as noted earlier, an overblown spike is not as effective in minimizing drag, it has been found to suffer little degradation in performance with angles of attack. Therefore, for application where performance of the overblown spike at zero angle of attack is satisfactory, the overblown spike permits effective operations at angles of attack without requiring sensing and control means related to the angle of attack.

While the foregoing embodiments have all employed virtual spikes originating at the main face of the vehicle, structure may be provided to initiate the spike at a more forward position. The position of a physical spike to support the nozzle minimizes the amount of gas supply needed and is thus suitable for some applications, particularly for applications in which such structure would not interfere with sensing operations. FIGURE 6 shows the forward portion of a vehicle 2 provided with a physical spike 68 to support nozzle 70. The mechanisms required for supply and control are identical with those for single-spike embodiments mentioned above. However, since the physical support provides part of the length needed, the spike is adjusted to a correspondingly shorter length to produce the same performance and flow patterns. As before, only a gaseous, virtual spike meets the oncoming stream.

FIGURE 7 shows the temperatures, as a percentage of stagnation temperature, produced when various physical and aerodynamic systems are employed. The aerodynamic systems were provided with a cool air supply. The temperature ratios are plotted against radial distance in from the perimeter of the vehicle. It will be seen that essentially the same temperatures are obtained with either a physical or narrow aerodynamic spike. Temperatures produced upon a physical hemispheric nose are in the same range until one approaches the center, when they increase considerably. If the ratio of jet to tunnel stagnation pressure is raised high enough to approach the "overblown" jet conditions described earlier, there is apparent jet mixing in the trapped air region so that the ejected gas is actually introduced into the boundary layer on the front of the plate. Under these conditions, the gas is extremely effective in controlling conditions on the face plate. Then, by using a cooled gas and/or a high specific heat gas such as helium, the high heat capacity of the ejected gas tends to insulate the plate and keep it from reaching the undesirable temperature of the other curves. In addition, a high specific heat gas, for example a low molecular weight gas such as helium, has a lubricating effect, being "slipperier" than the trapped air it reduces aerodynamic friction and thus the temperatures which the vehicle face reaches. Cool air flow rates of about 0.11 pound per second were sufficient to produce an optimum cooling jet for a 4.5 inch diameter vehicle at Mach 3.5.

FIGURE 7 shows the temperature ratio dropped to 82½% when an optimum cool air jet was used. This percentage reduction amounts to a temperature reduction of as much as 260° F. for flight at 30,000 feet and Mach 3.5. Furthermore, the temperature distribution is seen to be extremely flat as compared with any of the other curves. This uniform low temperature distribution would be valuable for use with radar systems and particularly desirable if sensing means such as an infra-red system is to be employed. Greater reductions in temperature may be obtained if a gas such as helium rather than cooled air is used to form the jet. In fact, approximately one-seventh the mass flow is required to produce the same temperature reduction if helium is used. It is important to note that with proper flow rates, the temperature of the face of the model could be reduced to slightly less than that of the coolant gas.

When physical spikes or narrow aerodynamic jets are employed, the face of the vehicle itself may be effectively cooled by ejecting extremely small additional quantities of cooled gas into the "trapped-air" region at the face. FIGURE 7 also shows the influence of gas ejection on vehicle face temperatures at Mach 3.5 on a 4.5 inch diameter vehicle when a physical spike is used. Similar improvement results when coolant gas is ejected at the face of a vehicle employing a narrow virtual spike. It will be seen that appreciable cooling of the face to temperatures well below that of the hemisphere, particularly toward the center, were produced by the ejection of a gas coolant. The particular improvement shown was obtained through the use of only 0.00077 pound per second of helium. Greater flows would produce greater cooling. Ordinary air may also be used, but is not as effective in reducing temperatures.

In some cases, it is desirable to provide windows in lateral surfaces of vehicles. FIGURE 8 illustrates an embodiment suitable for a lateral window. An opening 72 has been provided in the side of vehicle 2. Nozzle 74 is supplied with gas through line 28 from supply 24. Nozzle 74, shown in cross section, is not circular as have been the nozzles in previous embodiments, but rather extends the length of the forward edge of opening 72. A virtual shield or gaseous screen 76 is formed by the gas expelled from the nozzle. This shield forms a slight bulge in the airstream 32. Thus, low drag for the vehicle and protection of vehicle contents from aerodynamic buffeting has been provided without a solid physical window. At the same time, the hot window problem has been eliminated. If protrusion of equipment beyond the vehicle surface is desired, nozzle 74 may be inclined at a greater angle to the vehicle surface to produce a greater bulge in the shield and airstream. Thus, a larger protected volume may be provided while retaining an aerodynamically smooth effective vehicle surface. Drag will, of course, be increased somewhat as the degree of window bulge is increased but a cool transparent window will be provided for the radiation sensing equipment within. If desired, a plurality of individual nozzles rather than a single wide nozzle can be used.

The embodiments described above are illustrative only and do not serve to limit the invention. Those skilled in the aerodynamic arts will recognize that the teachings of the present invention provide means employing virtual spikes or shields which will reduce drag and temperature problems in a wide range of applications.

Having thus described our invention, we claim:

1. In a supersonic vehicle, means carried by said vehicle for generating a shock wave inducing virtual spike in advance of said vehicle comprising means for ejecting gas forwardly of said vehicle, said gas interacting with an atmosphere moving at supersonic velocities with respect to said vehicle.

2. In a supersonic vehicle, means for inducing a shock wave in advance of said vehicle comprising a jet of gas, said jet being directed forwardly of said vehicle to form a supersonic, gaseous spike, said spike initiating a shock wave in advance of said vehicle.

3. In a vehicle operating at supersonic velocity with respect to the atmosphere surrounding said vehicle, means for inducing a shock wave in advance of said vehicle comprising a nozzle, a source of gas connected with said nozzle, and means for ejecting gas at supersonic velocity through said nozzle to form a supersonic spike in advance of said vehicle, the interaction of said spike with said atmosphere initiating an oblique shock wave in advance of said vehicle.

4. In a vehicle operating at supersonic velocity with respect to the atmosphere surrounding said vehicle, means for inducing a shock wave in advance of said vehicle comprising a nozzle, a source of gas connected with said nozzle, means for ejecting gas at supersonic velocity through said nozzle to form a supersonic spike in advance of said vehicle, the interaction of said spike with said atmosphere initiating an oblique shock wave in advance of said vehicle, and means to control the flow of said gas to said nozzle to vary the length of said supersonic spike.

5. In a vehicle operating at supersonic velocity with respect to the atmosphere surrounding said vehicle, means for inducing a shock wave in advance of said vehicle comprising a nozzle, a source of gas connected with said nozzle, means for ejecting gas at supersonic velocity through said nozzle to form a supersonic spike in advance of said vehicle, the interaction of said spike with said atmosphere initiating an oblique shock wave in advance of said vehicle, means to sense the angle of attack at which said vehicle is operating, and means to offset said nozzle at an angle proportional to said angle of attack.

6. In a vehicle operating at supersonic velocity with respect to the atmosphere surrounding said vehicle, means for inducing a shock wave in advance of said vehicle comprising a plurality of nozzles in the forward portion of said vehicle, said nozzles being inclined toward the central axis of said vehicle, a source of gas connected with said nozzles, and means for ejecting gas at supersonic velocity through said nozzles to form supersonic spikes in advance of said vehicle, said spikes merging forwardly of said vehicle, the interaction of said spikes with said atmosphere initiating an oblique shock wave in advance of said vehicle.

7. In a vehicle operating at supersonic velocity with respect to the atmosphere surrounding said vehicle, means for inducing a shock wave in advance of said vehicle comprising a plurality of nozzles in the forward portion of said vehicle, said nozzles being inclined toward the central axis of said vehicle, a source of gas connected with said nozzles, means for ejecting gas at supersonic velocity through said nozzles to form supersonic spikes in advance of said vehicle, said spikes merging forwardly of said vehicle, the interaction of said spikes with said atmosphere initiating an oblique shock wave in advance of said vehicle, means to sense the angle of attack at which said vehicle is operating, and means to vary the distribution of gas to said nozzles in accordance with said angle of attack to offset said initiation of said oblique shock wave with respect to the central axis of said vehicle.

8. In a vehicle operating at supersonic velocity with respect to the atmosphere surrounding said vehicle, a transverse opening and means to shield said transverse opening in said vehicle comprising a jet of gas directed rearwardly from a position forward of said opening said gas interacting with said atmosphere, said atmosphere moving at supersonic velocities with respect to said vehicle, and the interaction of said jet with said atmosphere initiating a shock wave, the initiation of said shock wave occurring at a predetermined location.

9. In a vehicle operating at supersonic velocity with respect to the atmosphere surrounding said vehicle, a transverse opening and means to shield said transverse opening in said vehicle comprising a plurality of nozzles disposed forwardly of said opening, said nozzles being directed rearwardly across said opening, a source of gas connected to said nozzles, and means for ejecting gas at supersonic velocity through said nozzles to form jets of gas directed rearwardly across said opening.

References Cited by the Examiner

UNITED STATES PATENTS

| | | | |
|---|---|---|---|
| 1,376,316 | 4/1921 | Chilowsky | 102—50 X |
| 2,727,706 | 12/1955 | Heilig | 244—130 |
| 2,807,933 | 10/1957 | Martin | 60—39.65 X |
| 2,829,490 | 4/1958 | Kresse | 60—35.6 |
| 2,864,236 | 12/1958 | Toure et al. | 60—35.6 |
| 2,906,089 | 9/1959 | Kadosh et al. | 60—35.6 |
| 2,957,306 | 10/1960 | Attinello | 60—35.6 |

FOREIGN PATENTS 69,565   7/1958   France.

BENJAMIN A. BORCHELT, *Primary Examiner.*

ARTHUR M. HORTON, SAMUEL FEINBERG,
*Examiners.*

D. H. WARD, L. L. HALLACHER, V. R. PENDEGRASS, *Assistant Examiners.*